United States Patent Office 2,977,133
Patented Mar. 28, 1961

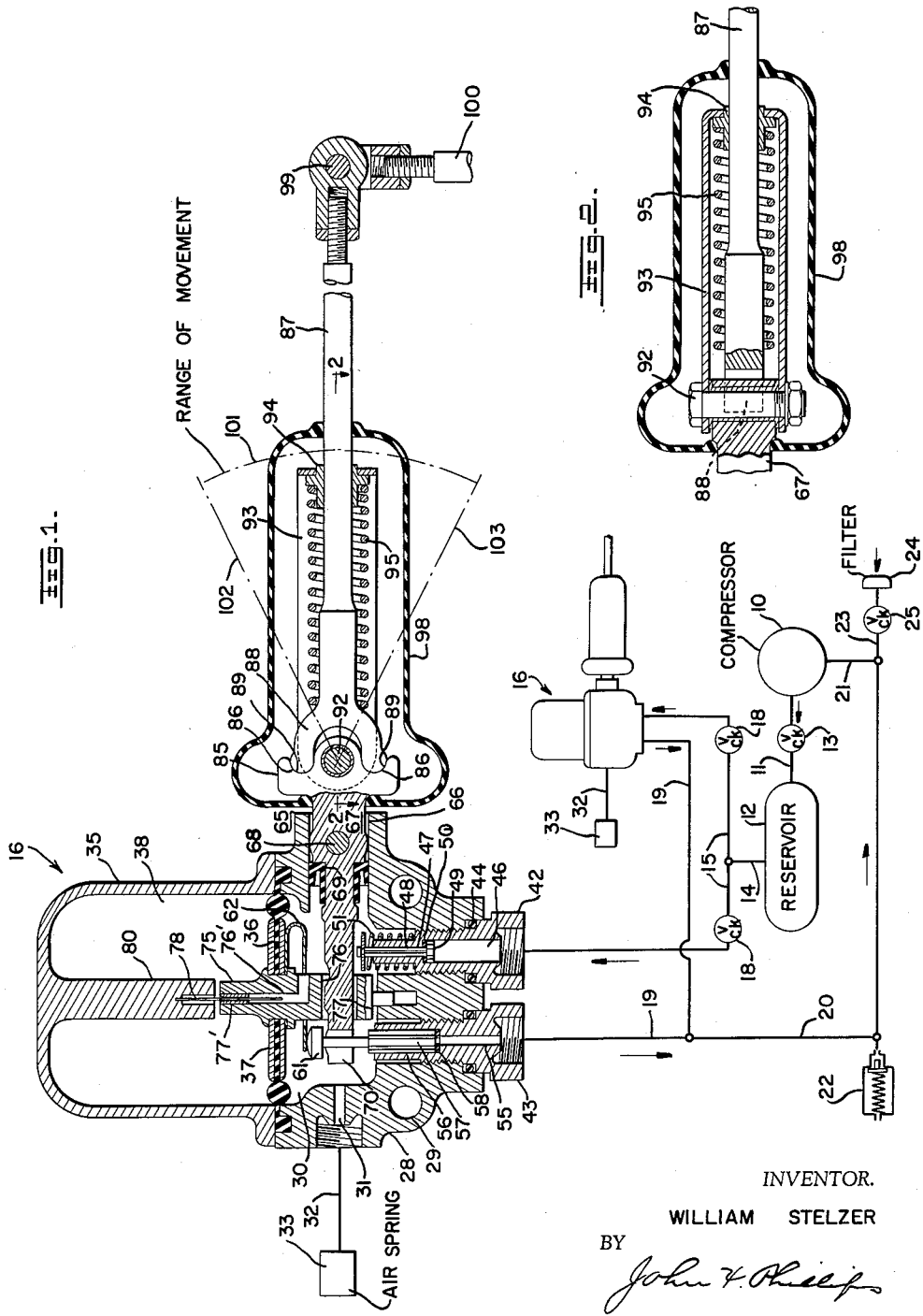

2,977,133
AIR SUSPENSION SYSTEM AND LEVELLING VALVE FOR MOTOR VEHICLES

William Stelzer, Bloomfield Hills, Mich., assignor to Kelsey-Hayes Company, Detroit, Mich., a corporation of Delaware Filed Mar. 10, 1958, Ser. No. 720,153

18 Claims. (Cl. 280—124)

This invention relates to an air suspension system for motor vehicles, and more particularly to a novel leveling valve for regulating the flow of air to one or a plurality of air springs of the vehicle.

Air suspension systems presently coming into use on motor vehicles to supplant previous spring suspension systems, employ automatic leveling valves for increasing the pressure in one or more air springs according to load variations, thus keeping the vehicle body properly leveled regardless of the weight being carried by the body or the distribution of such weight.

It is obvious that due to the passage of the vehicle wheels over uneven road surfaces, the air springs are being constantly deflected, the alternate up and down movement of the wheels increasing and decreasing the pressure in the air springs, which is desirable. To prevent constant variations in air spring pressures from controlling the inlet and outlet valves through which air is admitted to and released from the air springs, a damping mechanism is employed so that there will be no change in the mean pressures in the air springs unless such changes are desirable due to load variations. These damping mechanisms employ as a part thereof a plunger movable in a hydraulic cylinder. These damping mechanisms are unreliable since they depend on frictional resistance for their proper operation and are greatly influenced by temperature variations.

An important object of the present invention is to provide a novel type of leveling valve for vehicle air suspension systems wherein a novel delaying action is provided by which the air inlet and outlet valves for the air springs do not function unless conditions change which require the addition of more pressure into, or the releasing of pressure from, the air springs.

More specifically, an important object of the invention is to provide a novel mechanism which utilizes pressure variations in the air springs during jounce and rebound, to keep the inlet and exhaust valves of the leveling valve mechanism closed.

A further object is to provide novel means tending to be operative during up and down movement of the vehicle wheels for operating the inlet and outlet valves referred to, and to prevent such means from opening the inlet or outlet valves except after the passage of a predetermined time interval, thus preventing normal vertical movements of the wheels of the vehicle from admitting pressure to, or relieving pressure from, the air springs.

A further object is to provide a lever mechanism connected between the inlet and outlet valves and the running gear of the vehicle, which lever mechanism partakes of movement incident to vertical movement of the vehicle wheels, and to utilize air spring pressures for bodily moving a portion of the lever mechanism to prevent it from functioning under normal operating conditions.

A further object is to employ a control chamber communicating with an air spring and provided with inlet and outlet valves associated with the air spring, in combination with an auxiliary chamber divided from the control chamber by a pressure responsive device and having fixed leak communication with the control chamber whereby increases and decreases in pressure in the control chamber, incident to movement of the vehicle over a highway, will result in movement of the pressure responsive member to prevent operation of either the inlet or outlet valve until the fixed leak connection between the two chambers referred to effects movement of the pressure responsive member, thereby allowing the lever mechanism to function for operating the inlet and outlet valves.

Other objects and advantages of the invention will become apparent during the course of the following description.

In the drawing I have shown one embodiment of the invention. In this showing:

Figure 1 is a central vertical sectional view through one leveling valve unit with portions of the remainder of the air suspension system diagrammatically represented; and Figure 2 is a detail sectional view on line 2—2 of Figure 1.

Referring to Figure 1, and particularly to the diagrammatic showing of the system, the numeral 10 designates an air compressor employed on vehicles using air suspension systems for supplying air under pressure to the air springs. This compressor supplies air under pressure through a pipe 11 to a reservoir 12, a check valve 13 being interposed in the pipe 11. The reservoir is connected by an outlet pipe 14 to branch pipes 15, each of which leads to a leveling valve indicated as a whole by the numeral 16. It will be understood that one of the leveling valves is connected to each of the air springs employed on the vehicle. In the present instance, two of the leveling valves have been shown, one of which has been illustrated in detail in section and the other of which has been shown diagrammatically.

In each branch line is preferably arranged a check valve 18, and each branch line 15 constitutes the air pressure supply line to the associated leveling valve 16. From each of the leveling valves an exhaust line 19 leads to a common return line 20 through which air flows to return to the intake side of the compressor through a line 21. A low pressure blow-off valve 22 is connected to the return line 20. Air is also supplied to the compressor intake pipe 21 through a line 23 preferably provided with an air filter 24 and preferably also having a check valve 25 arranged therein.

As stated above, one of the leveling valves has been illustrated in detail, and referring to Figure 1, such valve comprises a body 28 having attaching bolt openings 29 and provided in the top portion thereof with a control chamber 30. This chamber is in constant communication through a port 31 with a line 32 leading to one of the air springs 33. A cover 35 is arranged over the body 28, and between the lower edge of the cover 35 and the top of the body 28 is clamped the peripheral portion of a diaphragm 36, mounted between plates 37. The diaphragm 36 thus separates the control chamber from an upper auxiliary chamber 38 formed in the cover 35.

Valve fittings 42 and 43 are adjustably threaded into the bottom of the body 28. These valve fittings are rendered leakproof by the use of O-rings 44, and it will be apparent that the structure of the valve fittings is such that they are vertically adjustable with respect to the operating mechanism described below. The fitting 42 is connected to one of the lines 15, while the fitting 43 is connected to one of the lines 19.

The fitting 42 is provided with an axial passage 46, and a smaller passage 47 extends from the passage 46 upwardly to communicate with the control chamber 30. A fluted stem or the like 48 extends through the passage 47 and carries at its lower end a valve 49 engageable with a resilient seat 50 on the shoulder between the passages 46 and 47. The valve 49 is seated by means of a light compression spring 51.

The fitting 43 is provided in its lower end with an axial passage 55 of small diameter and at its upper end with a passage 56 of larger diameter, the latter passage communicating at its upper end with the control chamber 30. A fluted valve 57 is slidable in the passage 56 and is provided at its lower end with a resilient valve seat 58, arranged on the shoulder between the passages 55 and 56. The upper end of the stem of the valve 57 is provided with a head 61 normally urged downwardly to seat the exhaust valve 58 by a leaf spring 62, further described below.

The side of the body 28 opposite the passage 31 is provided with an extension 65 having a bore 66 therethrough. A lever 67 extends through the bore 66 and is pivotally connected to the body 28 as at 68. The lever is sealed with respect to the bore 66 as at 69. The left-hand end of the lever 67 extends into the chamber 30. Such end of the lever has its end bifurcated as at 70 for the extension through the lever of the stem of the valve 57, and the top of the adjacent portion of the lever engages the under side of the head 61.

The diaphragm 36 and plates 37 are carried by an axial stem 75. The leaf spring 62, referred to above, is substantially J-shaped and is also fixed to the stem 75 as shown. The stem 75 is provided with a slot 76 therethrough. The left-hand end of the lever 67 projects diametrically through such slot and has appreciable clearance at the top and bottom thereof with respect to the slot. It will be apparent, therefore, that the lever end is adapted to partake of appreciable up and down movement without engaging the top and bottom of the slot 76. The stem 75 has its lower end 77 slightly spaced above the bottom face of the chamber 30, and accordingly the stem 75 is capable of limited movement downwardly from the normal position shown in Figure 1.

The cover 35 is provided therein with an axial extension 80, the lower end of which is slightly spaced from the upper end of the stem 75 to limit upward movement of the latter. The stem 75 is provided with a passage 76' communicating at its lower end with the chamber 30. In the upper end of the passage 76' is arranged a plastic insert 77' having a small passage therethrough. A wire 78, slightly smaller than the passage through the insert 77', extends through such passage and is anchored at its upper end to the axial extension 80. The passage in the insert 77', in cooperation with the wire 78, provides a fixed leakage between the chambers 30 and 38. Thus any changes in pressure in the chamber 30 will be communicated quite slowly to the chamber 38.

The right-hand end of the lever 67 is provided with a head 85 having semi-cylindrical horizontal recesses 86 formed therein. An operating lever member 87 is provided at its left-hand end with a yoke 88, the arms of which terminate in semicylindrical surfaces 89, engageable in the respective recesses 86.

The head 85 carries a pivot pin 92 connected to the ends of a yoke 93 (see Figure 2), and the lever member 87 projects through a plastic bearing 94 carried by the end of the yoke remote from the pivot pin 92. A compression spring 95 is interposed between the bearing 94 and the yoke 88 to urge the yoke ends 89 into engagement with the recesses 86. The head 85, yoke 93 and associated elements are preferably housed within a resilient boot 98.

The operating lever 87 is pivotally connected at its free end as at 99 with the upper end of a link 100, the other end of which is connected to one of the unsprung members of the vehicle, such as the associated axle.

Referring to Figure 1, it will be noted that the operating rod 87 has a range of movement 101 between upper and lower limits of movement indicated by the lines 102 and 103. This range of movement provides for maximum movement of the rod 87 in accordance with relative movements of the sprung and unsprung parts of the vehicle, but very slight movement will be transmitted to the lever 67, as will become apparent below.

*Operation*

The parts of the leveling valve normally occupy the positions shown in Figure 1 with the vehicle at rest. The inlet and exhaust valves both will be closed and air pressure will be trapped in the air spring 33.

Assuming that the vehicle is moving and passes over a raised spot in the road, an upward force will be transmitted through the rod 100 to the operating lever 87. The upper yoke end 89 will be caused to rock in its transverse groove 86, and the lower yoke end will move out of its recess 86. The spring 95 will be somewhat more compressed and the spring force will be transmitted through the upper yoke arm 88 to the upper recess 86, thus swinging the inner end of the lever 67 downwardly. This action, however, will not cause the lever 67 to engage and open the inlet valve 49. The reason for this is that when the action referred to occurs, pressure in the air spring 33 will increase, and such increase in pressure is transmitted directly to the control chamber 30 to move the diaphragm 36 upwardly, whereupon the bottom of the slot 76 will engage the inner end of the lever 67 to prevent the latter from moving downwardly. The increase in pressure in the chamber 30 over the pressure in the chamber 38 is sufficient to overcome the force transmitted by the spring 95 to tend to move the inner end of the lever 67 downwardly. Thus no air will be admitted through the inlet valve into the chamber 30. Upon the admission of increased pressure from the air spring into the chamber 30, air will flow through the passage 76' upwardly into the chamber 38. This flow of air, however, is quite restricted and does not result soon enough in elevating the pressure in the chamber 38 to balance the pressure in the chamber 30. Upon the return of the parts to normal positions after passing over a bump in the road, the previously increased pressure in the chamber 30 will be reduced since the air spring will have expanded to its normal capacity. Any slight increase in pressure in the chamber 38 occurring through the bleeding of air thereinto will be relieved, the air then flowing downwardly through the passage 76'.

Assuming that the vehicle axles pass over a rut or depression in the road, the free end of the operating lever 87 will move downwardly, unseating the upper yoke arm 88 from its associated recess 86 whereby force will be transmitted from the spring 95 through the lower recess 86 to tend to move the inner end of the lever 67 upwardly. This action, however, will not cause the head 61 to be elevated to open the exhaust valve 57. When such operation takes place, the air spring will expand, dropping the pressure in the air spring and also in the chamber 30. Pressure in the chamber 38 will now be higher than pressure in the chamber 30, thus moving the diaphragm 36 downwardly. The top of the slot 76 will engage the inner end of the lever 67 to hold this lever in a downward position against the tension of the spring 95, thus preventing the opening of the exhaust valve 57. During this operation there will be a seepage of air from the chamber 38 into the chamber 30, but pressure in the latter chamber will not increase sufficiently rapidly to balance the pressure in the chamber 38 to relieve the downward force on the inner end of the lever 67. Upward movement of the stem 75 is limited by the extension 80 while downward movement is limited by engagement of the stem end 77 with the bottom wall of the chamber 30.

From the foregoing it will be apparent that during normal vehicle operating conditions, the arm 87 is free to swing upwardly and downwardly due to uneven road surfaces, rebound, etc., without opening either the inlet or exhaust valves, and accordingly the mean pressure in the air springs will be maintained at the desired point.

Assuming that the vehicle is more heavily loaded for example if passengers enter the back seat of the vehicle, the free end of the operating lever 87 will be moved upwardly to effect downward movement of the inner end of the lever 67. This causes some increase in pressure in the air spring and a corresponding increase in the chamber 30, but the leakage of air through passage 76' into the chamber 38 will balance pressures in the chambers 30 and 38, thus utilizing the inner end of the lever 67 for pressing downwardly on the stem of the inlet valve 49 to admit additional pressure through the associated line 15 into the chamber 30. Thus the additional weight will be compensated for.

Conversely, assuming the vehicle previously has been relatively heavily loaded and several passengers leave the vehicle or other loads are removed therefrom, the vehicle body will move upwardly and the free end of the lever 87 will move downwardly. This results in a lowering of the pressure somewhat in the air spring 33, together with a corresponding lowering of pressure in the chamber 30. In a few moments, however, leakage from the chamber 38 through passage 76' will balance pressures in the chambers 30 and 38, and the force transmitted from the spring 95 to the lever 67 through the lower recess 86 will hold the inner end of the lever 67 upwardly in engagement with the head 61 to unseat the exhaust valve, thus relieving pressure from the chamber 30 and consequently from the air spring 33.

The general system shown in Figure 1 is purely for the purpose of illustrating the connection of the present leveling valve in such system. Obviously, the compressor 10 maintains the reservoir 12 charged with air pressure to the desired point. This pressure will be supplied as needed through the various branch lines 15 to the different leveling valves 16 in accordance with demands occurring under any desired operating conditions. The various check valves employed in the system are conventional and their use will be obvious. The low pressure blow-off valve 22 is employed to prevent back pressure in the lines 20 and 21 when pressure is released from the chambers 30 of the leveling valves, as will be apparent.

It will be obvious that the present construction eliminates the use of hydraulic damping means which depend on friction, and the viscosity of the fluid in which varies according to changes in temperature. Friction does not enter into the operation of the present mechanism which depends for its functioning solely on air pressures supplied from the reservoir 12. During normal operation, with a given load in the vehicle, the intake and exhaust valves for the air springs will remain closed regardless of vertical movement of the link 100. However, the pressures in the air springs will be increased or decreased in accordance with load conditions in the vehicle. If the frequency of movement of the air spring is very low, or if the car is standing still and the weight in the car is changed, the intake or exhaust valves are operated to level the car since the restraining influence of the diaphragm 36 of each air spring is reduced or not present.

The rate of leakage between the chambers 30 and 38 is controlled in accordance with the size of the orifice surrounding the wire 78. While dust and dirt are effectively excluded from the system by the filter 24, the use of the wire 78 is preferred to prevent any choking of the bleed orifice around the wire. There will be a relatively constant slight up and down movement of the diaphragm 36 during normal operations, which assists the wire 78 in maintaining the bleed orifice clear of any possible obstructions.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A vehicle air spring leveling system comprising an air spring, a valve mechanism having a control chamber separate from and communicating with said air spring, said mechanism being provided with an exhaust valve for exhausting pressure from said control chamber, and being provided with an inlet valve connected between said control chamber and a source of pressure and operable for admitting air pressure into said control chamber, a control device having a portion in said control chamber normally disengaged from said valves, said control device having a portion projecting externally of said valve mechanism and having means for connecting it with the running gear of the vehicle, said control device being operable to tend to engage it with said inlet valve upon movement of said control device incident to relative upward movement of the vehicle running gear and being operable to tend to open said exhaust valve upon relative downward movement of the running gear, and pressure responsive means subject to variations in pressure in said control chamber for momentarily preventing said control device from opening either of said valves.

2. A vehicle air spring leveling system comprising an air spring, a valve mechanism having a control chamber communicating with said air spring, said mechanism being provided with an exhaust valve for exhausting pressure from said control chamber, and being provided with an inlet valve connected between said control chamber and a source of pressure and operable for admitting air pressure into said control chamber, a control device having a portion in said control chamber normally disengaged from said valves, said control device having a portion projecting externally of said valve mechanism and having means for connecting it with the running gear of the vehicle, said control device being operable to tend to engage it with said inlet valve upon movement of said control device incident to relative upward movement of the vehicle running gear and being operable to tend to open said exhaust valve upon relative downward movement of the running gear, an auxiliary chamber in said mechanism, a pressure responsive element separating said chambers, and control means connected between said pressure responsive element and said control device whereby momentary increases in pressure in said control chamber cause said control means to engage said control device to prevent the latter from opening either of said valves, and means providing fixed leakage between said chambers whereby a change in pressure in one of said chambers will be communicated to the other of said chambers after an interval of time to render said control means inoperative for controlling said control device.

3. A vehicle air spring leveling system comprising an air spring, a valve mechanism having a control chamber communicating with said air spring, an exhaust duct communicating with said control chamber, an exhaust valve in said exhaust duct, an inlet duct communicating with said inlet chamber, an inlet valve in said inlet duct, said valves being biased to closed position and having stems in said control chamber, a pivoted lever having an end projecting into said chamber and engageable with said stems, operating means for said lever connectible to the vehicle running gear, means connecting said operating means to said lever to transmit forces from the former to the latter and to provide for relative movement therebetween whereby said operating means is movable to a greater extent than said lever, relative upward movement of the vehicle running gear transmitting force through said operating means to said lever to tend to open said inlet valve and relative downward movement of the vehicle running gear transmitting forces through said operating means to said lever to tend to open said exhaust valve, pressure responsive means subject to variations in pressure in said control chamber and having mechanical connection with said lever whereby an increase in pressure in said control chamber prevents said lever from opening said inlet valve and decreases in pressure in said chamber prevent opening movement of said exhaust valve, and means operative after an interval of time after the occurrence of a variation in pressure in said chamber from a normal average pressure for rendering said pressure responsive means inoperative for preventing movement of said lever.

4. A vehicle air spring leveling system comprising an air spring, a valve mechanism having a control chamber communicating with said air spring, an exhaust duct communicating with said control chamber, an exhaust valve in said exhaust duct, an inlet duct communicating with said inlet chamber, an inlet valve in said inlet duct, said valves being biased to closed position and having stems in said control chamber, a pivoted lever having an end projecting into said chamber and engageable with said stems, operating means for said lever connectible to the vehicle running gear, means connecting said operating means to said lever to transmit forces from the former to the latter and to provide for relative movement therebetween whereby said operating means is movable to a greater extent than said lever, relative upward movement of the vehicle running gear transmitting force through said operating means to said lever to tend to open said inlet valve and relative downward movement of the vehicle running gear transmitting forces through said operating means to said lever to tend to open said exhaust valve, pressure responsive means exposed to said control chamber to be subject to variations in pressure therein and having mechanical connection with said lever, an auxiliary chamber to which said pressure responsive means is exposed, and means providing a fixed leakage between said chambers whereby momentary changes in pressure in said control chamber will move said pressure responsive means to prevent said lever from opening either of said valves until leakage between said chambers tends to balance pressures therein.

5. A vehicle air spring leveling system comprising an air spring, a valve mechanism having a control chamber separate from and communicating with said air spring, said mechanism being provided with an exhaust valve for exhausting pressure from said control chamber, and being provided with an inlet valve connected between said control chamber and a source of pressure and operable for admitting air pressure into said control chamber, a control device having a portion in said control chamber normally disengaged from said valves, said control device having a portion projecting externally of said valve mechanism, an operating device having means for connecting it to the running gear of the vehicle, means comprising a spring device for transmitting movement from said operating device to said control device to tend to engage the latter with said inlet valve to open it upon movement of said operating device incident to relative upward movement of the vehicle running gear and to tend to open said exhaust valve upon relative downward movement of the running gear, and means connected to said control device and comprising pressure responsive means subject to variations in pressure in said control chamber for momentarily preventing said control device from opening either of said valves upon a change in pressure in said control chamber.

6. A vehicle air spring leveling system comprising an air spring, a valve mechanism having a control chamber communicating with said air spring, said mechanism being provided with an exhaust valve for exhausting pressure from said control chamber, and being provided with an inlet valve connected between said control chamber and a source of pressure and operable for admitting air pressure into said control chamber, a control device having a portion in said control chamber normally disengaged from said valves, said control device having a portion projecting externally of said valve mechanism, an operating device having means for connecting it to the running gear of the vehicle, means comprising a spring device for transmitting movement from said operating device to said control device to tend to engage the latter with said inlet valve to open it upon movement of said operating device incident to relative upward movement of the vehicle running gear and to tend to open said exhaust valve upon relative downward movement of the running gear, a diaphragm forming one wall of said control chamber, a stem connected to said diaphragm and engageable with said control device upon upward and downward movement of said diaphragm to prevent movement of said control device, an auxiliary chamber of which said diaphragm forms one wall, and means providing fixed leakage between said chambers whereby rapid changes in the relative pressures in said chambers will move said diaphragm to prevent said control device from opening either valve and whereby, after an interval of time, said fixed leakage will tend to balance pressures in said chamber and render said diaphragm inoperative for preventing movement of said control device.

7. A vehicle air spring leveling system comprising an air spring, a control chamber separate from and communicating with said air spring, inlet and exhaust ducts communicating with said chamber respectively to admit air to and exhaust it from such chamber, an inlet valve in said inlet duct and an exhaust valve in said exhaust duct, control means in said chamber engageable with said valves whereby movement of such means in one direction opens said inlet valve, and movement in the other direction opens said exhaust valve, an operating device connectible to the vehicle running gear, resilient means for transmitting force from said operating device to said control means whereby relative upward movement of the running gear moves said control means in said one direction and relative downward movement of the running gear moves said control means in said other direction, and means responsive to variations in pressure in said control chamber and connected to said control means for applying thereto a force proportional to pressure variations in said control chamber for preventing said movements of said control means for a predetermined length of time after a variation in pressure has occurred in said control chamber.

8. A vehicle air spring leveling system comprising an air spring, a control chamber communicating with said air spring, inlet and exhaust ducts communicating with said chamber respectively to admit air to and exhaust it from such chamber, an inlet valve in said inlet duct and an exhaust valve in said exhaust duct, control means in said chamber engageable with said valves whereby movement of such means in one direction opens said inlet valve, and movement in the other direction opens said exhaust valve, an operating device connectible to the vehicle running gear, resilient means for transmitting force from said operating device to said control means whereby relative upward movement of the running gear moves said control means in said one direction and relative downward movement of the running gear moves said control means in said other direction, an auxiliary chamber, a diaphragm separating said chambers from each other and movable by differential pressures therein, and means providing fixed leakage between said chambers whereby said diaphragm will move incident to changes in relative pressures in said chambers to prevent said movements of said control means and whereby, after an interval of time, pressures will tend to become balanced in said chambers to render said diaphragm inoperative for preventing said movements of said control means.

9. A vehicle air spring leveling system comprising an air spring, a body having a control chamber therein communicating with said air spring, inlet and exhaust ducts communicating with said chamber respectively to admit air to and exhaust it from such chamber, an inlet valve in said inlet duct and an exhaust valve in said exhaust duct, a control lever pivoted to said body, one end of said lever projecting into said chamber and the other end projecting externally of said body, said one end of said lever being engageable with said valves whereby movement of said one end of said lever in said one direction opens said inlet valve and movement in the other direction opens said exhaust valve, an operating device connectible to the vehicle running gear, force transmitting means comprising a spring for transmitting force from said operating device to said lever whereby relative upward movement of the running gear moves said one end of said lever in said one direction to open said inlet valve and relative downward movement of the running gear moves said one end of said lever in said other direction to open said exhaust valve, and means responsive to variations in pressure in said control chamber and connected to said lever for applying thereto a force proportional to pressure variations in said control chamber for rendering said one end of said lever inoperative for opening either valve for a predetermined length of time after a variation in pressure has occurred in said control chamber.

10. A vehicle air spring leveling system comprising an air spring, a body having a control chamber therein communicating with said air spring, inlet and exhaust ducts communicating with said chamber respectively to admit air to and exhaust it from such chamber, an inlet valve in said inlet duct and an exhaust valve in said exhaust duct, a control lever pivoted to said body, one end of said lever projecting into said chamber and the other end projecting externally of said body, said one end of said lever being engageable with said valves whereby movement of said one end of said lever in said one direction opens said inlet valve and movement in the other direction opens said exhaust valve, an operating device connectible to the vehicle running gear, force transmitting means comprising a spring for transmitting force from said operating device to said lever whereby relative upward movement of the running gear moves said one end of said lever in said one direction to open said inlet valve and relative downward movement of the running gear moves said one end of said lever in said other direction to open said exhaust valve, an auxiliary chamber, a diaphragm sealing said chambers from each other and movable by differential pressures therein, a stem carried by said diaphragm, said stem having portions engageable with opposite sides of said lever to prevent movement thereof upon movement of said diaphragm in said one direction or said other direction incident to differential pressures in said chambers, and means providing fixed leakage between said chambers whereby pressures in said chambers tend to balance after an interval of time following an increase or decrease in pressure in one of said chambers to render said stem inoperative for preventing said movements of said one end of said lever.

11. A system according to claim 10 wherein said means for providing said fixed leakage between said chambers comprises a passage through said stem communicating at opposite ends with said chambers.

12. A system according to claim 10 wherein said means for providing fixed leakage between said chambers comprises a passage through said stem opening at one end into said control chamber and at its other end into said auxiliary chamber, and an element fixed to said body in alinement with and projecting into said other end of said passage to reduce the effective cross sectional area thereof.

13. A vehicle air spring leveling system comprising an air spring, a body having a control chamber therein communicating with said air spring, inlet and exhaust ducts communicating with said chamber respectively to admit air to and exhaust it from such chamber, an inlet valve in said inlet duct and an exhaust valve in said exhaust duct, a control lever pivoted to said body, one end of said lever projecting into said chamber and the other end projecting externally of said body, said one end of said lever being engageable with said valves whereby movement of said one end of said lever in said one direction opens said inlet valve and movement in the other direction opens said exhaust valve, an operating device connectible to the vehicle running gear, force transmitting means comprising a spring for transmitting force from said operating device to said lever whereby relative upward movement of the running gear moves said one end of said lever in said one direction to open said inlet valve and relative downward movement of the running gear moves said one end of said lever in said other direction to open said exhaust valve, an auxiliary chamber, a diaphragm dividing said chambers and movable by differential pressures therein, a stem carried by said diaphragm and having one end projecting into said control chamber and provided with a diametrical opening through which said one end of said lever freely projects, said diametrical opening having one wall engageable with said one end of said lever upon movement of said diaphragm in one direction to prevent said lever from opening said inlet valve and having an opposite wall engageable with said one end of said lever upon movement of said diaphragm in the other direction to prevent said one end of said lever from opening said exhaust valve, and means providing slow leakage between said chambers whereby said diaphragm will move said stem to prevent movement of said one end of said lever upon a change in differential pressures in said chambers and whereby pressures will tend to balance after an interval of time in said chambers to render said stem inoperative for preventing movement of said one end of said lever.

14. A system according to claim 13 wherein said force transmitting means comprises a pair of bearing surfaces on opposite sides of a plane passing through the longitudinal center of said lever coincident with the pivot axis thereof, said operating device having a yoke provided with ends respectively engaging said bearing surfaces, said spring urging said yoke ends in the direction of said bearing surfaces to tend to maintain them in engagement therewith whereby, when said operating device is moved, one of said yoke ends will move out of engagement with its bearing surface and the other yoke end will engage its associated bearing surface to transmit force from said spring to said lever to tend to turn said lever.

15. A system according to claim 13 wherein said body is provided with a bore, said lever projecting through said bore and having a pivot pin connecting it to said body, and resilient sealing means in said bore to seal said lever relative thereto while permitting rocking movement of said lever relative to said body.

16. A vehicle air spring leveling valve device comprising a body having a control chamber and an auxiliary chamber, a diaphragm separating said chambers to be subject to movement by differential pressures therein, an inlet duct and an exhaust duct communicating with said control chamber, inlet and exhaust valves in the respective ducts biased to closed position, a lever pivoted to said body and having one end projecting into said control chamber and another end projecting externally of said body, said one end of said lever being engageable with said inlet valve upon turning movement of said lever in one direction for opening said inlet valve and engageable with said exhaust valve upon turning movement of said lever in the other direction for opening said exhaust valve, a stem carried by said diaphragm and having oppositely facing surfaces engageable with said one end of said lever whereby one of such surfaces engages said one end of said lever to prevent turning movement of said lever when said diaphragm moves in one direction and the other surface engages said one end of said lever to prevent turning movement thereof when said diaphragm moves in the other direction, and means providing fixed leakage between said chambers.

17. A vehicle air spring leveling valve device comprising a body having a control chamber and an auxiliary chamber, a diaphragm separating said chambers to be subject to movement by differential pressures therein, an inlet duct and an exhaust duct communicating with said control chamber, inlet and exhaust valves in the respective ducts biased to closed position, a lever pivoted to said body and having one end projecting into said control chamber and another end projecting externally of said body, said one end of said lever being engageable with said inlet valve upon turning movement of said lever in one direction for opening said inlet valve and engageable with said exhaust valve upon turning movement of said lever in the other direction for opening said exhaust valve, and a stem carried by said diaphragm and having oppositely facing surfaces engageable with said one end of said lever whereby one of such surfaces engages said one end of said lever to prevent turning movement of said lever when said diaphragm moves in one direction and the other surface engages said one end of said lever to prevent turning movement thereof when said diaphragm moves in the other direction, said stem having a passage therethrough providing for fixed leakage between said chambers.

18. A vehicle air spring leveling valve device comprising a body having a control chamber and an auxiliary chamber, a diaphragm separating said chambers to be subject to movement by differential pressures therein, an inlet duct and an exhaust duct communicating with said control chamber, inlet and exhaust valves in the respective ducts biased to closed position, a lever pivoted to said body and having one end projecting into said control chamber and another end projecting externally of said body, said one end of said lever being engageable with said inlet valve upon turning movement of said lever in one direction for opening said inlet valve and engageable with said exhaust valve upon turning movement of said lever in the other direction for opening said exhaust valve, a stem carried by said diaphragm and having oppositely facing surfaces engageable with said one end of said lever whereby one of such surfaces engages said one end of said lever to prevent turning movement of said lever when said diaphragm moves in one direction and the other surface engages said one end of said lever to prevent turning movement thereof when said diaphragm moves in the other direction, said stem having a passage communicating at one end with said control chamber and at its other end with said auxiliary chamber, and a fixed member carried by said body and projecting into said other end of said passage to limit the effective area thereof.

References Cited in the file of this patent
UNITED STATES PATENTS

| | | |
|---|---|---|
| 2,361,575 | Thompson | Oct. 31, 1944 |
| 2,490,311 | Rostu | Dec. 6, 1949 |
| 2,844,384 | Jackson | July 24, 1958 |